(12) United States Patent
Erlingsson

(10) Patent No.: US 7,353,241 B2
(45) Date of Patent: Apr. 1, 2008

(54) METHOD, MEDIUM AND SYSTEM FOR RECOVERING DATA USING A TIMELINE-BASED COMPUTING ENVIRONMENT

(75) Inventor: Ulfar Erlingsson, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 10/808,099

(22) Filed: Mar. 24, 2004

(65) Prior Publication Data

US 2005/0216527 A1    Sep. 29, 2005

(51) Int. Cl.
G06F 12/00    (2006.01)
(52) U.S. Cl. ..................... 707/202; 707/204
(58) Field of Classification Search ................ 711/161, 711/162; 707/203
See application file for complete search history.

(56) References Cited

U.S. PATENT DOCUMENTS

| | | | | |
|---|---|---|---|---|
| 5,713,024 | A | 1/1998 | Halladay | 395/712 |
| 6,480,944 | B2 * | 11/2002 | Bradshaw et al. | 711/162 |
| 6,725,241 | B1 * | 4/2004 | Rodriguez et al. | 707/203 |
| 7,093,086 | B1 * | 8/2006 | van Rietschote | 711/161 |
| 2003/0167380 | A1 | 9/2003 | Green et al. | 711/136 |

FOREIGN PATENT DOCUMENTS

| | | |
|---|---|---|
| EP | 1 349 089 A2 | 10/2003 |
| WO | WO 98/20419 | 5/1998 |
| WO | WO 01/01251 A1 | 1/2001 |

OTHER PUBLICATIONS

Bekker, Scott, "Microsoft Virtual PC 2004 RTMs," *ENT News*, Nov. 2003, 101communications LLC, http://www.entmag.com/news/print.asp?EditorialsID=6026.

Breen, Christopher, "Rewind 1.1 Worthwhile Data-recovery Utility Has Rough Edges," *Macworld*, Apr. 2001, Mac Publishing LLC, http://www.macworld.com/2001/04/reviews/rewind/.

(Continued)

*Primary Examiner*—Apu Mofiz
*Assistant Examiner*—Paul Kim
(74) *Attorney, Agent, or Firm*—Woodcock Washburn LLP

(57) ABSTRACT

The present description discloses a technique for recovering data using a timeline-based computing environment. Data items of the application are periodically saved for recovery such that the saved data items can be used to recover the application at a point in time when the items are saved. As a result, a search through a time-based computing environment is provided to recover the application at different points in time. The application with the saved data items can then be recovered at a designated point in time. Each saved data item can also be indexed with metadata, which are used to conduct a search to generate a list of data items according to a match between the indexed metadata and a user selected variable. Moreover, when the application is a communication client having multiple messages, an index data to indicate whether a message in the communication client is spam is saved. Using this index data, a search that includes or excludes the spam messages can then be conducted. Thus, using a timeline-based computing environment, an improved method and system of recovering data that is more user friendly, effective, and manageable is thus provided.

10 Claims, 4 Drawing Sheets

OTHER PUBLICATIONS

Derthick, Mark et al., "Data Exploration across Temporal Contexts," Proceedings of Intelligent User Interfaces, Jan. 2000, New Orleans, LA.

Gagne, Marcel, "Review: VMware Workstation 4.0.5," *Unix Review*, Feb. 2004, http://www.unixreview.com/print/.

Gemmell, Jim et al., "My LifeBits: Fulfilling the Memex Vision," *ACM Multimedia '02*, Dec. 2002, ACM, Juan Les Pins, France.

Rekimoto, Jun, "Time-Machine Computing: A Time-centric Approach to the Information Environment," Sony.

Santry, Doug et al., "Deciding When to Forget in the Elephant File System," SOSP, 1999.

\* cited by examiner

METHOD, MEDIUM AND SYSTEM FOR RECOVERING DATA USING A TIMELINE-BASED COMPUTING ENVIRONMENT

FIELD OF THE INVENTION

This invention relates generally to the recovery of data in a computing environment, and more particularly to a way to use, archive, and recover data and application state using a timeline-based approach.

BACKGROUND

In the last few years, users have become highly dependent upon computers for professional and personal communications. As a result, everyday, users are exchanging valuable information using the computer that is not only restricted to text, but also sound, pictures, music, and video over the computer. However, with this sea of information being stored on the computer, users tend to find it hard to manage such a mass of data. Moreover, data recoverability becomes more important as the amount and the value of the information grows over an extended length of time. Although more and more people are handling most of their personal and business information in a computer environment, at the same time, the fragility of computers and software applications has not been properly addressed. For example, without diligent use of backup mechanisms, information can be easily lost. However, the problem with backup mechanisms is that the time and effort necessary for recovery is usually high. The risk of potential data loss is further compounded by the large increase in worms and virus activities in recent years.

Thus, the information-handling software, such as an operating system or application, can get into an unusable state, where information can no longer be retrieved. A state generally refers to the current configuration, attributes, condition, or information content of the information-handling software. Moreover, because the wealth of information tends to accumulate over time, users eventually cannot save their information in ways that make sense to them anymore. As a result, users may have difficulty finding a particular desired piece of information. To that extent, global catalogues, such as listings of all files or times by name or time, and hierarchical categorization cannot provide enough context information to differentiate the desired items from other items. Indexers similarly do not solve the problem, in part because users relate best to a visual layout of data. To worsen the matter, backups can actually exasperate this problem, because if users store backups in the same namespace as the actual information, numerous different versions with similar names and content will accumulate over time. Furthermore, different variants similarly tend to lead to multiple versions of the same files or data items, which would increase the overall confusion over where the desired information is actually located.

One known method for archiving files using a time-centric approach involves dragging the files to the desktop for archiving. When the file is no longer needed, users can delete the file using a trashcan on the desktop. However, when the user needs a deleted file at a later time, the user can recover the deleted file by specifying a time when the file was on the desktop and restoring the desktop from that time. Consequently, instead of using a hierarchical folder system, users archive files by simply dragging them to the desktop.

A variation of this method further includes a system that is based on time-based inter-application communication. The method essentially has three features: (1) each software application has the notion of "current time," (2) when the "current time" of one application is changed, the application notifies the other application of this changed time, and as a result (3) the other application change their "current time" states according to this information. With these features, the time-based desktop system can be manipulated to change the time of any related application of a document on the desktop to ensure that the document opens properly.

The problem with these two methods is that they relate only to a way for users to keep track of their files that is an alternative to the existing hierarchical folder structure, namely a time based approach. At best, these methods provide a way to pull up a deleted file or a method to easily save files based on a current time. However, these methods do not provide a way to recover applications from a prior point in time, nor do they provide a way to archive an application's state. Moreover, the method does not address applications that do not have a consistent saved file that is visible to the user. Thus, there is a need for an improved method and system for archiving and recovering data.

BRIEF SUMMARY OF THE INVENTION

The invention pertains to a way of archiving and recovering data in a computing environment, more specifically, archiving and recovering applications using a timeline-based approach.

In embodiments of the present invention, a method and system of recovering an application along with the working files of the application is shown. In particular, in one embodiment, data items of the application are periodically saved for recovery, wherein the saved data items allow the recovery of the application with its working files from a point in time when the items were saved. A search through a timeline-based archive can then be conducted to recover the application at different points in time. After such a point in time has been designated, the application can accordingly then be recovered using the saved data items of the application at that designated point in time. Moreover, in embodiments of the invention, data from the recovered application can be copied and pasted to the application at the present time for usage. Still in another embodiment, metadata for each saved item can be indexed, and a search of this metadata can be conducted with user selected search variables. From the search, a list of data items according to a match between the saved metadata and the user selected search variable can be generated for selection.

In yet another embodiment, wherein the application is a communication client having multiple messages, index data is saved to indicate whether a message in the communication client is spam, such as unsolicited email or other information, which can then be used in a search that does not search messages that have been indicated as spam using a user selected search variable. A list of messages according to a match between the searched messages and the user selected search variables is accordingly generated from the search. An alternative embodiment relating to a communication client is adapted to mark the index data to indicate whether the message is spam, and the messages indicated as spam are purged prior to saving any data items of the client for recovery.

Through these various embodiments, a way to recover data using a timeline-based approach has been provided. The invention provides an improved technique for recovering data that is user friendly, effective, and manageable. As a result, users can recover data from previous points in time, which supports both recovery from a corrupted state and recovery of important information in the context of its creation and use. Because a timeline-based approach tends to be more intuitive than the current folder hierarchies, the invention provides an easy-to-comprehend paradigm that allows for a simple and intuitive graphical representation and end-user interface for recovering data. To support this paradigm, a continuous automatic capturing of the user computing environment and context is performed in embodiments of the invention as described.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The present description discloses a technique for recovering an application using a timeline-based approach. Specifically, data items of an application are periodically saved for recovery such that the saved data items can be used to recover the application with its working files at a time when the items were saved. As a result, a search through a time-based archive is provided to recover the application at different points in time. Accordingly, the application along with its files can be recovered at a designated point in time using the saved information. Thus, in using a timeline-based approach, an improved method and system of recovering data that is more user friendly, effective, and manageable has been provided.

The invention can operate in a computing environment. In an embodiment of the invention, the described process operates on a collection of one or more computing devices. A suitable computing device usable in implementing all or some aspects of the invention will be first described with reference to FIG. 1, after which a network environment according to particular embodiments of the invention will be more fully described.

Although there are many computing devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
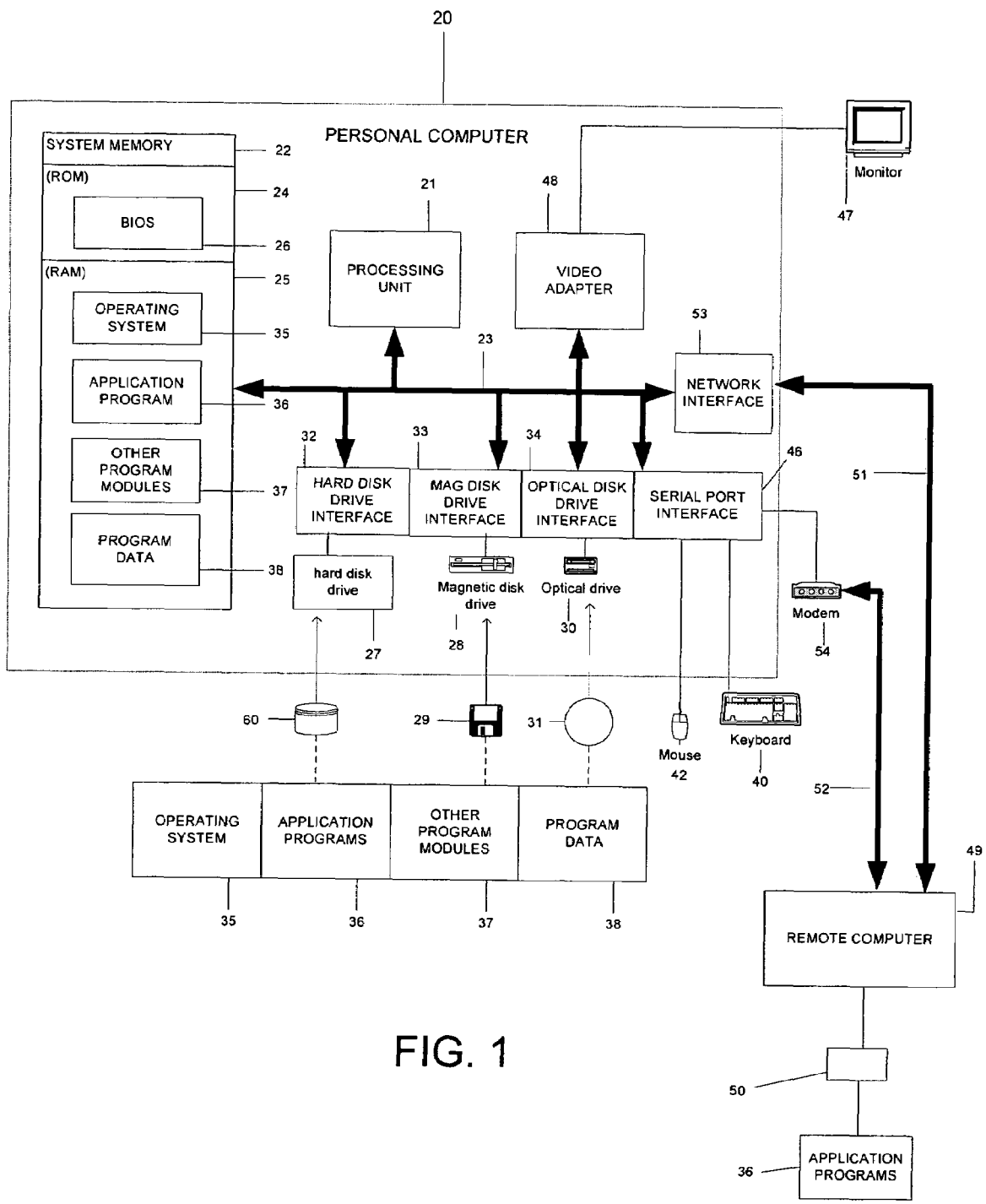
FIG. 1 is a block diagram generally illustrating an example of a device architecture in which all or a part of the embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment. A number of program modules may be stored on the hard disk 60, magnetic disk 29, optical disk 31, ROM 24 or RAM 25, including an operating system 35, one or more applications programs 36, other program modules 37, and program data 38.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates or is operable in a networked environment using logical connections to one or more remote computers, such as a remote computer 49. The remote computer 49 may be a domain controller, a server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices such as clients, domain controllers, servers, and so on may be of the architecture as described above with respect to FIG. 1 regarding computer 20 and/or remote computer 49, or may alternatively have any other type of architecture. The computer operations described herein are executed pursuant to the reading of computer-executable instructions from a computer-readable medium by a computer or computing device. Computer-readable media include optical, magnetic, electrical and other types of media, as well as storage media, transmission media, and so on.

Figure 2:
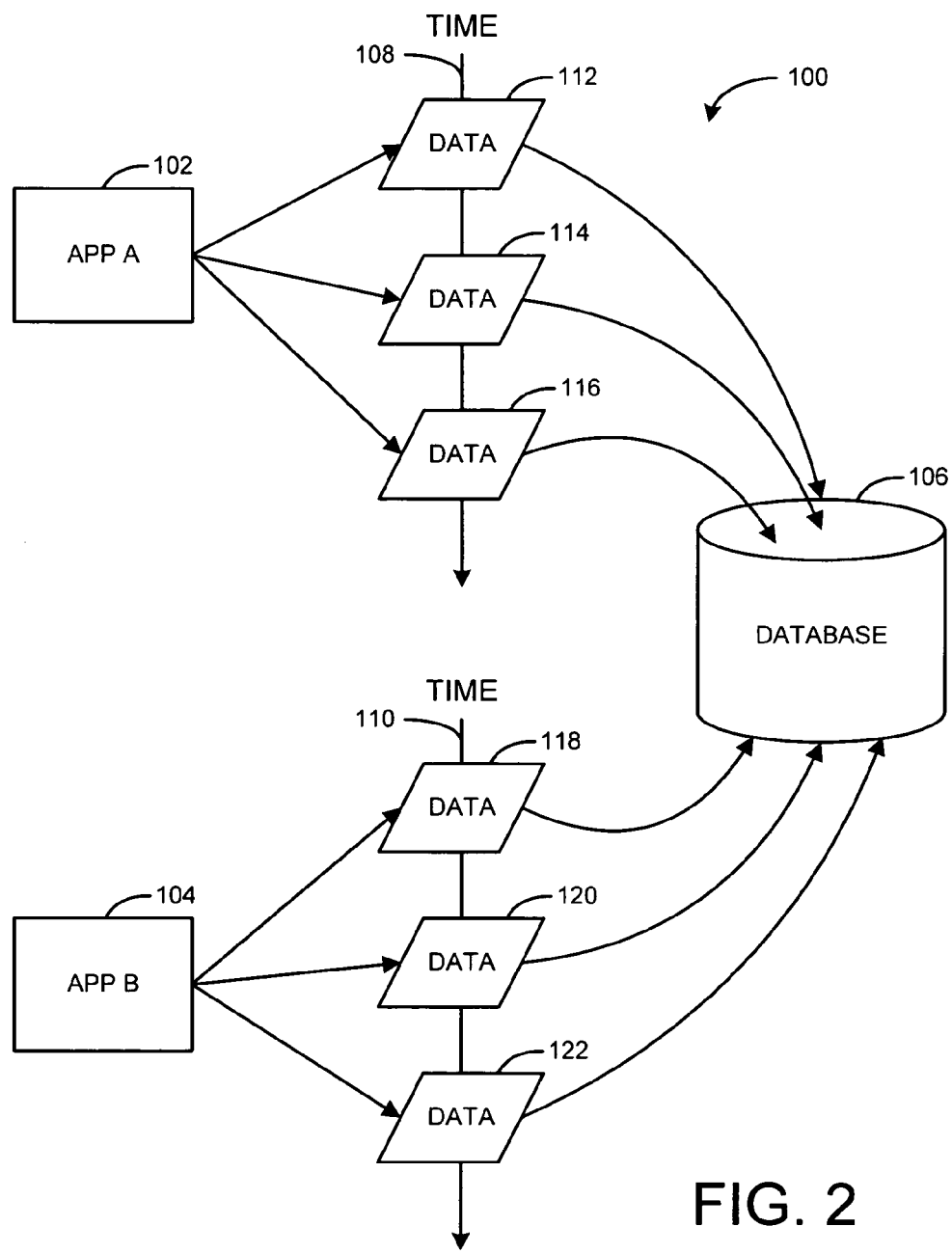
FIG. 2 is a schematic diagram showing an overall structure of an exemplary computing environment in which all or part of the embodiments of the present invention may be implemented.

Referring now to FIG. 2, the present invention can be implemented in a computing environment 100, which includes multiple applications 102, 104, and a database 106. In embodiments of the invention, applications 102 and 104 are tracked for recovery based on timelines 108 and 110. Specifically, timelines 108 and 110 are associated with each application A 102 and application B 104, respectively. Multiple embodiments to trigger the saving of data to the database can be used, depending on the type of application. For example, one embodiment can include saving of data 112, 114, and 116 to the database 106 whenever there is a change in the application A 102. In another embodiment, data 118, 120, and 122 from application B 104 can be saved to the database 106 at predefined time durations. Either of these two embodiments can be altered to reduce its database storage requirements by saving data first to a temporary location, and at least updating the database if the saved data is different from the most recent data in the database. Data includes any information that is needed to recover the application at the point in time when the data for the application is being saved. Thus, data can include, but is not limited to, the working files, recovery files, temporary files, database entries, registry keys, memory state, screenshots, and/or other predefined application state, of the application. Working files are consistent user files that are permanently saved in stable storage, while recovery files are consistent files that may be temporary or permanently saved to stable storage as backup or recoverable files of the working files. These various implementations of capturing data from the applications and the type of data that is saved can depend on the type of applications and storage capacity of the computing environment.

Furthermore, each of the applications 102 and 104 shown in FIG. 2 can be an operating system or a user application, depending on the need and usage of the implementation. Although the present invention is particularly useful for information-worker applications, such as email clients, note-taking applications, or collaboration applications, the present invention can be used for any type of application. In fact, one embodiment of the invention creates nested computing environments, each having its own associated timeline such that the outermost environment can be a modem operating system. Thus, the present invention contemplates an implementation of saving data relating to the whole operating system including the user applications and sub-applications, or as simple as a single user application operating in an operating system. Again, these various implementations would greatly depend on the needs and usage of the users and the types of systems.

Figure 3:
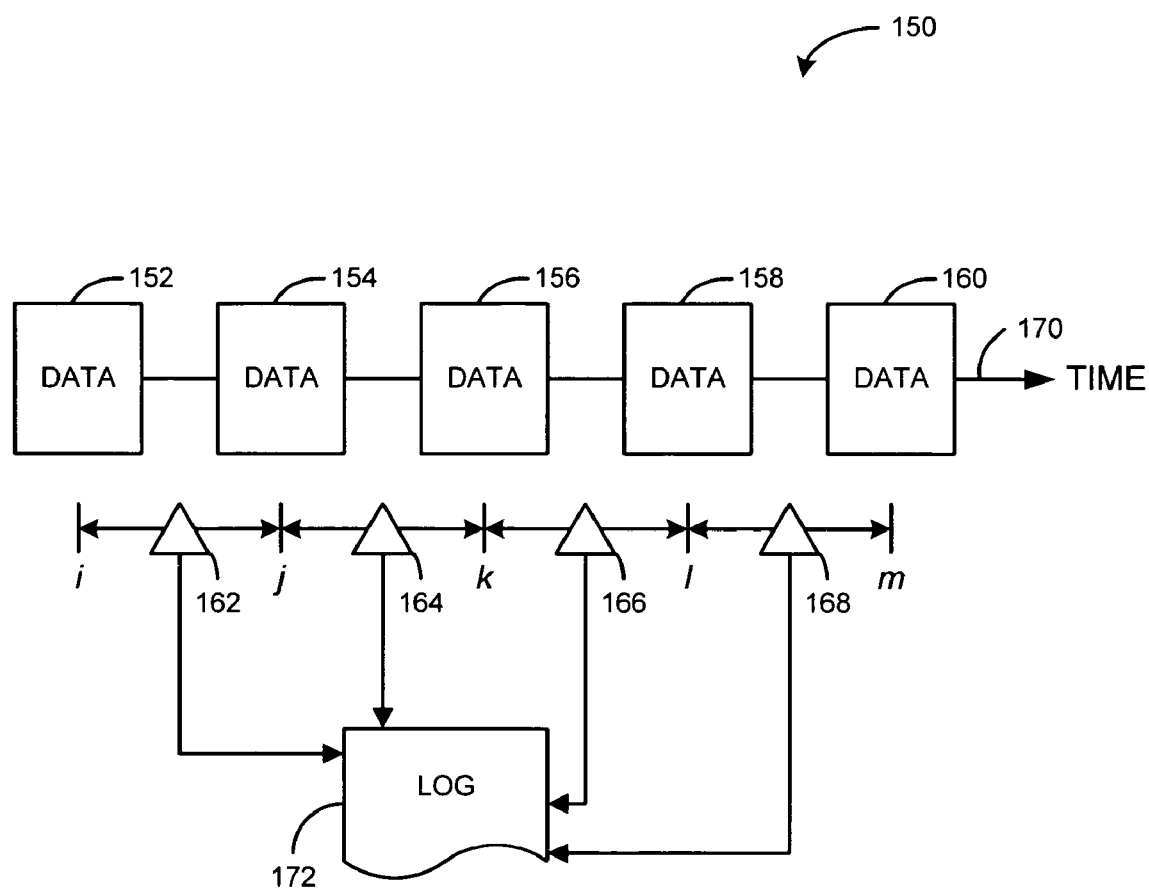
FIG. 3 is a schematic diagram showing an exemplary structure of data generated by an application over a timeline, which is usable to implement an embodiment of the invention.

In one embodiment of the present invention, a continuous automatic capturing of data generated by an application is shown in FIG. 3 and indicated generally at 150. As shown, data 152, 154, 156, 158, and 160 from an application changes over time either from user usage or application usage. Data shown in FIG. 3 can include any information that relates to the application at a point in time. The information can include, but is not limited to, the working files, recovery files, temporary files, database entries, registry keys, memory state, screenshots, and/or other predefined application state, of the application at a specific point in time. In the embodiment shown, the changes to one or more of these data items are saved to the database. Specifically, the changes between the data, which are indicated by delta Δ 162, 164, 166, and 168, are based on a timeline 170. For delta Δ 162, 164, 166, and 168, the changes are saved onto a log 172. In this embodiment shown, the changes are continuously and automatically appended into the log over time. In other words, the changes (e.g., delta Δ 162) between the data 152 at time i and data 154 at time j are appended to the log 172, and delta Δ 164, which includes the changes between the data 154 at time j and data 156 at time k, is appended to the log 172. Similarly, delta Δ 166 indicates the changes between data 156 at time k and data 158 at time l, and delta Δ 168 indicates the changes between data 158 at time l and data 160 at time m.

Using the information saved in the log 172, such as the screenshots at various points in time, the present invention is able to provide a graphical application window that illustrates a screenshot from a particular point in time. The user can identify a desired point in time by reviewing the screenshots. Once the user identifies a desired point in time, the application from that point in time can be recreated using the saved information in the log 172. Users can thus interact with a timeline to recover their work environment at different points in time.

Users can be provided a user interface that includes a representation of the application window graphical state with the pointer indicating different points in time. The user can physically move the pointer on a timeline at the user interface to select a point in time for recovery. In one embodiment, a low-resolution compact representation of the application window graphical state is used while the user is moving to the pointer on the timeline. However, once the user stops moving the pointer at the selected point, the application window graphical state is preferably recreated in full resolution from the underlying state, specifically using the saved data items in the log 172. The recorded timeline can store any other contextual information in addition to a state of the application window. For example, the recorded timeline can track geographic location of the user or the computer at each point in time (e.g., for quick identification of work done on a business trip in different locations). Other contextual information may include an image of the user or the surroundings taken by a digital camera attached to the computer or the user's work pattern (e.g., how much they were working, at what hours, on what type of information, etc.). This information can be shown graphically to the user as they move the pointer on the timeline. As shown, the types of contextual information to include with the recorded timeline are boundless, and thus the present invention is not limited to these exemplary contextual information. Other various contextual information is therefore contemplated, and they are within the scope of the present invention.

Moreover, the present invention is not limited to a single linear time, but can allow for arbitrary forking as well to provide alternative views. Forking can be used to create visual representation of alternate timelines that have their start at a given point in time either on the initial timeline or on another forked timeline. The fork is therefore a series of application states that proceed from the users activity from a particular point. These forks may be displayed graphically on the timeline. As one example, when the user scrolls back to different points in time, a graphical representation of the forking is displayed to the user. Whenever the application is being worked on, a fork can be generated on the timeline to indicate to the user that the application has been modified in some way. Along the fork, further annotations may be added to describe the application, such as work done to the application or title of the file that was used. In other words, in one embodiment, a fork is automatically created whenever a user scrolls back to do work in the application at a given point in time.

These forks in one embodiment are transient or volatile, and may not be saved to permanent storage, which would allow the past to be immutable. However, an alternative embodiment of forking is to permanently save the work done to the application in that past point in time. Information relating to the present change to the application in that past point in time can also be included for user reference. Moreover, these series of states may be saved in the database as a persistent visual image of the alternate timeline on which the user works. With the various information saved relating to the application with the use of forking, a graphical representation of these forking in relation to the points in time can then be displayed to the user. As a result, when the user is scrolling through the timeline, the user is presented with a timeline that is more familiar and streamlined according to a previous sequence of actions taken by the user.

With the use of the log, another mechanism is also provided to allow information items to be moved between different points in time can also be implemented, which will be referred to as an out-of-band-message-passing mechanism. Using this mechanism, if a user wishes to retrieve and modify an information item from a previous time, the user can move to a window graphical state at time x and copy a selected item to a clipboard, and then move back to the application in the current point in time and paste the selected data in the application in the present time for modifications. As a result, users are able to retrieve past data and use the past data in the present, while at the same time keeping the data immutable to avoid any alteration of the past data. Such a mechanism can be implemented using the current copy-and-paste clipboard mechanisms. Moreover, to ensure that the past data would not be changed, a graphical representation indicating to the user that they are operating in a "read-only mode" when working on the application at a past point in the time. Also, the timeline does not have to be strictly linear nor does the pointer have to move equally fast when the user moves it around. The timeline, on the contrary, can be highly dynamic, giving the user a tactile feel for the underlying saved state, such as the degree and types of change, the volume of data, discontinuities, or other work patterns, etc.

In another embodiment, metadata, which generally refers to data that describe the content, quality, condition, and/or other characteristics of data, can be indexed and saved to the log 172. There are numerous ways for the metadata to be generated. In one embodiment, metadata can be the result of predefined user actions, such as filing a message in a folder. In another embodiment, metadata can also be generated automatically by using contextual information of the application, such as choosing relevant key text, cataloging images based on an analysis of the images' content, or determining predefined criteria of messages. As a result, not only can users recover data through a timeline-based interface, but they can also recover data by searching metadata, such as a name or a keyword. Thus, the present invention contemplates a cross-sectional (e.g., a recovery search based on metadata) and as well as a linear (e.g., a recovery search based on a timeline) recovery paradigm.

In particular, the log 172 is preferably an append-only log that includes summary as well as pointer information for each data item. The summary can contain enough data to help find the data item in an unstructured sea of items. In the case of text, all the words in the text for an index-based search can be a brief representation of the data file, whereas the pointer can allow the user to go to the point-in-time where the data item is located. Typically, the final version of each data item would be represented in the log 172. However, there may be many final versions for a given item. For example, as the user goes back and retrieves old items for further modification, the log can be used to maintain pointers to all such items and represent how these items have been derived as well. As shown, various types of information can be saved to the log 172, and the data structure of the saved information can be implemented in a variety of ways. Thus, the present invention is not limited to the embodiments shown, and other implementations that can be readily appreciated by one skilled in the art are contemplated and are within the scope of the present invention.

Figure 4:
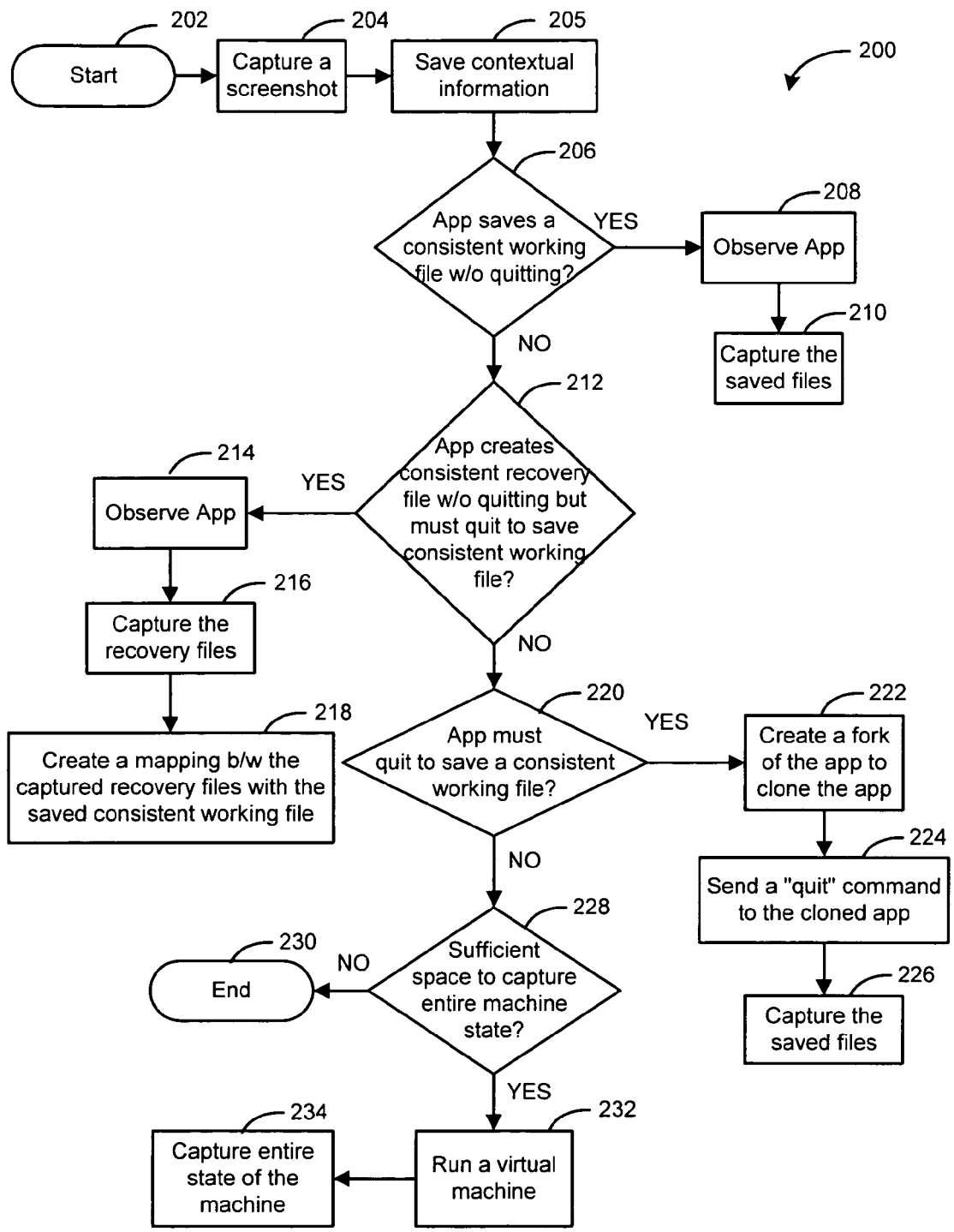
FIG. 4 is a flow chart illustrating steps according to an embodiment of the invention for saving recoverable data of an application.

Turning now to FIG. 4, a flow chart illustrating steps according to an embodiment of the invention for saving the recovery information of an application is shown and indicated generally at 200. The process starts at step 202 by capturing a screenshot of the application at step 204. As discussed in FIGS. 2 and 3, the screenshot is captured in such a way that allows the users to view the screen shot in low resolution during a search, and after a designated point in time has been selected, the live application itself, as opposed to a screenshot, can then be displayed to the users.

Referring to FIG. 3, a screenshot of the application may be captured and saved with data 152 at time i, but it may not be necessary to save the entire screenshot the next time j, because much of the data needed for the screenshot at time j may be generally found when the screen was captured at time i. Thus, the information that needs to be saved is the changes delta Δ 162 between time i and time j that is needed to reconstruct the screenshot. As a result, the data, such as a screenshot can be captured more efficiently by using the minimal resources of the computer.

After a screenshot has been captured at step 204, contextual information relating to the application is saved at step 205. In particular, the contextual information that is relevant to the point in time is being saved. In other words, contextual information can be any information that is helpful to the user to remember this point in time. Thus, as discussed, contextual information may include geographic location of the user or the computer at each point in time, an image of the user or the surroundings taken, user's work pattern, or relevant key words.

The process next determines whether the application is of a type that saves a consistent working file without quitting the application at step 206. Email programs generally use consistent working files to prevent the user's current drafts from being lost in case of a failure. If the application is of the type that saves a consistent working file without quitting, the process preferably observes the application at step 208 and captures and archives the consistent working file saved by the application at step 210.

If, on the other hand, the application is not of a type that can save a consistent working file without quitting at step 206, the process, at step 212, determines whether the application is of a type that creates a consistent recovery file without quitting but must quit to save the consistent working file. Word processing program generally save consistent recovery files when they quit to save a user's document from being lost in case of a failure. As is well known by those of skill in the art, word processing applications initiate and complete a save file operation before shutting down. Thus, as is well known in the art, after receiving a request to terminate or quit by a user, such word processing applications initiate and complete a save operation as the application quits. Word processing programs also generally save consistent recovery files while they are operating. If the application is such an application as described at step 212, the application is again observed by the process at step 214 to capture the consistent recovery file saved by the application at step 216. At step 218, a mapping is created between the captured recovery files and the saved consistent working file when the application quits.

If, however, the application is not an application of the type that saves a consistent recovery file without quitting but must quit to save a consistent working file at step 212, the process next determines whether the application is of a type that must quit in order to save a consistent working file in the system at step 220. If so, the application can be forked to create a clone of the application at step 222. A quit command can then be sent to the cloned application at step 224. When the application quits, it saves a consistent working file. As a result, the process is able to capture the saved files for recovery at step 226, even though the copy of the application with which the user is interacting continues to operate in an expected manner.

Referring back to step 220, if, however, the application is not of a type that must quit in order to save a consistent working file, the process determines whether there is sufficient space to capture an entire state of the operating system or the overall computing device at step 228. If not, the process simply ends at step 230, because the various available options to save information of the application for recovery have been exhausted. But if there is sufficient space to capture the entire state, the process can execute a virtual machine at step 232. In order to save the state of the system on which the application is running, the virtual machine is preferably executed prior to the execution of the application so that the application can be executed within the context of the virtual environment created by the working machine. The entire state of the virtual machine is captured at step 234, which includes all the needed information related to the last state of the application. An alternative embodiment is simply to capture the entire state of the operating system or the overall computing system. However, because a virtual machine's state can often be saved by merely saving a few files created by the virtual machine, the former process can be more efficient.

One major concern when archiving data in a recovery system is the amount of resources that is needed to save the data. As a result, a communication client that generally includes multitudes of messages can be problematic, because saving a state of such an application tends to overburden the disk space and the resources of the system. A mechanism thus is preferably implemented to reduce wasted information being saved during the process. One such example is spam messages in the communication client. In one embodiment, to avoid saving spam messages, an index with additional data can be included for indicating whether each message is spam. Such an implementation can include two different searches to offer the user some flexibility. Specifically, the user can choose between a fast search that does not search the spam index data and a slower search that includes the spam index data when recovering the data. Moreover, since a spam indicator is part of the index data, it is recommended that the user be given a way to mark or unmark a message as spam or not spam, or at minimum, an automatic user default can be included with the application setting.

In an alternative embodiment, the communication client can also be forced to clean out the spam before the state of the communication client is saved. For example, before the client can quit, the spam messages can be automatically or manually purged. As a result, recovery of the data is preferably at a state that is immediately after the spam messages have been purged. Unfortunately, although the wasted information would less likely be saved, users take a risk of losing valuable information that was wrongly labeled as spam messages.

Thus, it will be appreciated that an improved system and method for recovering data using a timeline-based computing environment has been described. In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that some elements of the illustrated embodiments shown in software may be implemented in hardware and vice versa or that the illustrated embodiments can be modified in arrangement and detail without departing from the spirit of the invention. In addition, the illustrated processes may be slightly modified and reordered without departing from the spirit of the invention. Therefore, the invention as described herein contemplates all such embodiments as may come within the scope of the following claims and equivalents thereof.

I claim:

1. A method of recovering an application using a timeline-based computing environment, the method comprising the steps of:

periodically saving data items of the application for recovery, wherein the saved data items allow the recovery of the application at a point in time when the items were saved;

searching a time-based archive of the saved data items;

designating a point in time from which to recover the application;

displaying saved data items that were saved at the designated point in time and recovering the application using the data items saved at the displayed designated point in time;

wherein periodically saving data items further comprises the steps of:

making a first determination of whether the application is of a type that saves a consistent working file without receiving a quit request;

observing the application and capturing the consistent working file when the first determination is true;

when the first determination is not true, making a second determination of whether the application is of a type that saves a consistent recovery file without receiving a quit request but must receive a quit request in order to save a consistent working file;

when the second determination is true, observing the application for any recovery file that is saved and capturing the saved recovery file;

capturing a mapping between the captured recovery file and the consistent working file;

when the second determination is not true, making a third determination of whether the application must receive a quit request before saving a consistent working file;

when the third determination is true, creating a clone of the application;

sending a quit command to the clone of the application to initiate a save file command;

capturing any saved files responsive to the save file command;

when the third determination is not true, running a virtual machine;

executing the application in the virtual machine; and capturing the state of the virtual machine at the point in time.

2. The method according to claim 1 further comprising the step of saving contextual information relevant to the point in time when the data items are saved.

3. The method according to claim 1 further comprising the step of generating a fork of the recovered application at the designated point for usage.

4. The method according to claim 3 wherein the generated fork is an alternative timeline reflecting new usage of the recovered application.

5. The method according to claim 1 further comprising the steps of:

copying data from the application recovered at the designated point in time;

returning to a current point in time; and pasting the copied data in the application in the current point in time.

6. A computer-readable medium having thereon computer-executable instructions for recovering an application using a timeline-based computing environment, the instructions for performing steps comprising:

periodically saving data items of the application for recovery, wherein the saved data items allow the recovery of the application at a point in time when the items were saved;

searching a time-based archive of the saved data items;

designating a point in time from which to recover the application;

displaying saved data items that were saved at the designated point in time and recovering the application using the data items saved at the displayed designated point in time;

wherein periodically saving data items further comprises the steps of:

making a first determination of whether the application is of a type that saves a consistent working file without receiving a quit request;

observing the application and capturing the consistent working file when the first determination is true;

when the first determination is not true, making a second determination of whether the application is of a type that saves a consistent recovery file without receiving a quit request but must receive a quit request in order to save a consistent working file;

when the second determination is true, observing the application for any recovery file that is saved and capturing the saved recovery file;

capturing a mapping between the captured recovery file and the consistent working file;

when the second determination is not true, making a third determination of whether the application must receive a quit request before saving a consistent working file;

when the third determination is true, creating a clone of the application; sending a quit command to the clone of the application to initiate a save file command;

capturing any saved files responsive to the save file command;

when the third determination is not true, running a virtual machine;

executing the application in the virtual machine; and capturing the state of the virtual machine at the point in time.

7. The medium according to claim 6 further comprising computer-executable instructions for saving contextual information relevant to the point in time when the data items are saved.

8. The medium according to claim 6 further comprising computer-executable instructions for generating a fork of the recovered application at the designated point for usage.

9. The medium according to claim 8 wherein the generated fork is an alternative timeline reflecting new usage of the recovered application.

10. The medium according to claim 6 further comprises computer-executable instructions for:

copying data from the application recovered at the designated point in time; returning to a current point in time; and pasting the copied data in the application in the current point in time.

* * * * *